US012786721B2

(12) United States Patent
Yao

(10) Patent No.: US 12,786,721 B2
(45) Date of Patent: Nov. 3, 2026

(54) DEVICE IDENTIFIER COUNTERFEITING PREVENTION METHOD AND APPARATUS, AND ELECTRONIC DEVICE

(71) Applicant: VIVO MOBILE COMMUNICATION CO., LTD., Guangdong (CN)

(72) Inventor: Ping Yao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/635,634

(22) Filed: Apr. 15, 2024

(65) Prior Publication Data

US 2024/0259811 A1 Aug. 1, 2024

Related U.S. Application Data

(63) Continuation of application No. PCT/CN2022/124341, filed on Oct. 10, 2022.

(30) Foreign Application Priority Data

Oct. 15, 2021 (CN) ........................ 202111201849.1

(51) Int. Cl.

| | |
|---|---|
| ***H04W 12/02*** | (2009.01) |
| ***H04W 12/043*** | (2021.01) |
| ***H04W 12/06*** | (2021.01) |
| ***H04W 12/126*** | (2021.01) |
| ***H04W 12/71*** | (2021.01) |

(52) U.S. Cl.

CPC ......... *H04W 12/126* (2021.01); *H04W 12/02* (2013.01); *H04W 12/043* (2021.01); *H04W 12/06* (2013.01); *H04W 12/71* (2021.01)

(58) Field of Classification Search

CPC ..... H04W 12/02; H04W 12/06; H04W 12/69; H04L 9/3247; H04L 63/12; H04L 63/0421

See application file for complete search history.

(56) References Cited

U.S. PATENT DOCUMENTS 9,898,620 B2 * 2/2018 Unagami ............ G06F 21/6254
10,713,311 B2 * 7/2020 Wang .................. H04L 67/1097

(Continued)

FOREIGN PATENT DOCUMENTS

CN 104283853 A 1/2015
CN 104881602 A 9/2015

(Continued)

OTHER PUBLICATIONS

Second Office Action in CN Application No. 202111201849.1 dated May 17, 2024 (15 pages, including English translation).

(Continued)

*Primary Examiner* — Zachary A. Davis
(74) *Attorney, Agent, or Firm* — BROOKS KUSHMAN P.C.

(57) ABSTRACT

A device identifier counterfeiting prevention method and apparatus, and an electronic device are provided in this application. The device identifier counterfeiting prevention method applied to the electronic device includes: in a case that a request for querying for an open anonymous device identifier by a target application program is received, obtaining an initial open anonymous device identifier; running a trusted application program in a trusted execution environment, where the trusted application program encrypts the initial open anonymous device identifier by using a private key, to obtain a first signature; generating a first open anonymous device identifier based on the initial open anonymous device identifier and the first signature; and reporting the first open anonymous device identifier to a server, where the server can identify authenticity of the first open anonymous device identifier by using a public key, and the public key matches the private key.

12 Claims, 4 Drawing Sheets

(56) References Cited

U.S. PATENT DOCUMENTS

| | | | | |
|---|---|---|---|---|
| 11,177,955 | B2 * | 11/2021 | Jacobs | H04L 9/3073 |
| 2012/0089518 | A1 * | 4/2012 | Blonchek | H04L 9/3226 235/494 |
| 2013/0290711 | A1 | 10/2013 | Rajkumar et al. | |
| 2014/0173071 | A1 | 6/2014 | Hazen et al. | |
| 2015/0248549 | A1 | 9/2015 | Han et al. | |
| 2016/0021111 | A1 | 1/2016 | Zhai | |
| 2020/0296581 | A1 | 9/2020 | Loreskar et al. | |

FOREIGN PATENT DOCUMENTS

| | | | |
|---|---|---|---|
| CN | 106156618 | A | 11/2016 |
| CN | 106899552 | A | 6/2017 |
| CN | 109766678 | A | 5/2019 |
| CN | 111598573 | A | 8/2020 |
| CN | 111625846 | A | 9/2020 |
| CN | 111966993 | A | 11/2020 |
| CN | 112148724 | A | 12/2020 |
| CN | 112507291 | A | 3/2021 |
| CN | 112926046 | A | 6/2021 |
| CN | 113342854 | A | 9/2021 |
| CN | 113938878 | A | 1/2022 |

OTHER PUBLICATIONS

International Search Report for International Application No. PCT/CN2022/124341 mailed Dec. 21, 2022 (16 pages, including English translation).

* cited by examiner

DEVICE IDENTIFIER COUNTERFEITING PREVENTION METHOD AND APPARATUS, AND ELECTRONIC DEVICE

CROSS-REFERENCE TO RELATED APPLICATIONS

This application is a continuation of International Application PCT/CN2022/124341 filed on Oct. 10, 2022, which claims priority to Chinese Patent Application No. 202111201849.1 filed on Oct. 15, 2021, which are incorporated herein by reference in their entireties.

TECHNICAL FIELD

This application belongs to the field of data encryption technologies, and specifically, relates to a device identifier counterfeiting prevention method and apparatus, and an electronic device.

BACKGROUND

As privacy data of users of the mobile Internet is increasingly strictly managed, application programs are not allowed to obtain the International Mobile Equipment Identity unless necessary. Currently, a supplementary device identifier is usually used instead of the International Mobile Equipment Identity, to provide a personalized service while user privacy is protected. The supplementary device identifier is usually generated on a mobile terminal by using a reference value+a random value, and includes an open anonymous device identifier (OAID), a vender anonymous device identifier (VAID), an application anonymous device identifier (AAID), and the like, so that an application program identifies a user by using the foregoing supplementary device identifier, and relevant data is processed on a serving end based on the device identifiers.

However, the device identifier is generated on a mobile phone, while the relevant code of a generation rule is relatively public (or a hacker can illegally obtain the relevant code through decompilation and in other means). Therefore, after the relevant generation rule is obtained, various supplementary device identifiers may be generated in batches according to the generation rule, and application logic is counterfeited and reported to the serving end, to obtain economic benefits. In addition, due to a characteristic of the supplementary device identifier, the serving end cannot detect, based on the device identifier, whether the device identifier is counterfeited.

SUMMARY

An objective of embodiments of this application is to provide a device identifier counterfeiting prevention method and apparatus, and an electronic device.

According to a first aspect, an embodiment of this application provides a device identifier counterfeiting prevention method, performed by an electronic device, where the method includes:

- in a case that a request for querying for an open anonymous device identifier by a target application program is received, obtaining an initial open anonymous device identifier;
- running a trusted application program in a trusted execution environment, where the trusted application program encrypts the initial open anonymous device identifier by using a private key, to obtain a first signature;

- generating a first open anonymous device identifier based on the initial open anonymous device identifier and the first signature; and
- reporting the first open anonymous device identifier to a server, where the server can identify authenticity of the first open anonymous device identifier by using a public key, and the public key matches the private key.

According to a second aspect, an embodiment of this application provides a device identifier counterfeiting prevention method, performed by a server, where the method includes:

- receiving a first open anonymous device identifier reported by an electronic device, where the first open anonymous device identifier includes a first signature, and the first signature is obtained after the electronic device encrypts an initial open anonymous device identifier by using a private key;
- identifying authenticity of the first open anonymous device identifier by using a public key, to generate an authenticity identification result, where the public key matches the private key; and
- returning the authenticity identification result to the electronic device.

According to a third aspect, an embodiment of this application provides a device identifier counterfeiting prevention apparatus, applied to an electronic device, where the apparatus includes:

- an obtaining module, configured to: in a case that a request for querying for an open anonymous device identifier by a target application program is received, obtain an initial open anonymous device identifier;
- an encryption module, configured to run a trusted application program in a trusted execution environment, where the trusted application program encrypts the initial open anonymous device identifier by using a private key, to obtain a first signature;
- a first generation module, configured to generate a first open anonymous device identifier based on the initial open anonymous device identifier and the first signature; and
- a reporting module, configured to report the first open anonymous device identifier to a server, where the server can identify authenticity of the first open anonymous device identifier by using a public key, and data encrypted by using the private key can be decrypted only by using the public key corresponding to the private key.

According to a fourth aspect, an embodiment of this application provides a device identifier counterfeiting prevention apparatus, applied to a server, where the apparatus includes:

- a receiving module, configured to receive a first open anonymous device identifier reported by an electronic device, where the first open anonymous device identifier includes a first signature, and the first signature is obtained after the electronic device encrypts an initial open anonymous device identifier by using a private key;
- an identification module, configured to identify authenticity of the first open anonymous device identifier by using a public key, to generate an authenticity identification result, where the public key matches the private key; and
- a returning module, configured to return the authenticity identification result to the electronic device.

According to a fifth aspect, an embodiment of this application provides an electronic device, where the electronic device includes a processor, a memory, and a program or instructions stored in the memory and capable of running on the processor, and when the program or the instructions are executed by the processor, the steps of the method according to the first aspect are implemented.

According to a sixth aspect, an embodiment of this application provides a readable storage medium, where the readable storage medium stores a program or instructions, and when the program or the instructions are executed by the processor, the steps of the method according to the first aspect or the second aspect are implemented.

According to a seventh aspect, an embodiment of this application provides a chip, where the chip includes a processor and a communication interface, the communication interface is coupled to the processor, and the processor is configured to run a program or instructions to implement the method according to the first aspect or the second aspect.

According to an eighth aspect, a computer program/program product is provided, where the computer program/program product is stored in a non-transient storage medium, and the program/program product is executed by at least one processor to implement the steps of the method according to the first aspect or the second aspect.

According to a ninth aspect, a communication device is provided, configured to perform the steps of the method according to the first aspect or the second aspect.

DETAILED DESCRIPTION

The following clearly describes technical solutions in the embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, a device identifier counterfeiting prevention method and apparatus, and an electronic device provided in the embodiments of this application are described below in detail by using specific embodiments and application scenarios of the embodiments.

Figure 1:
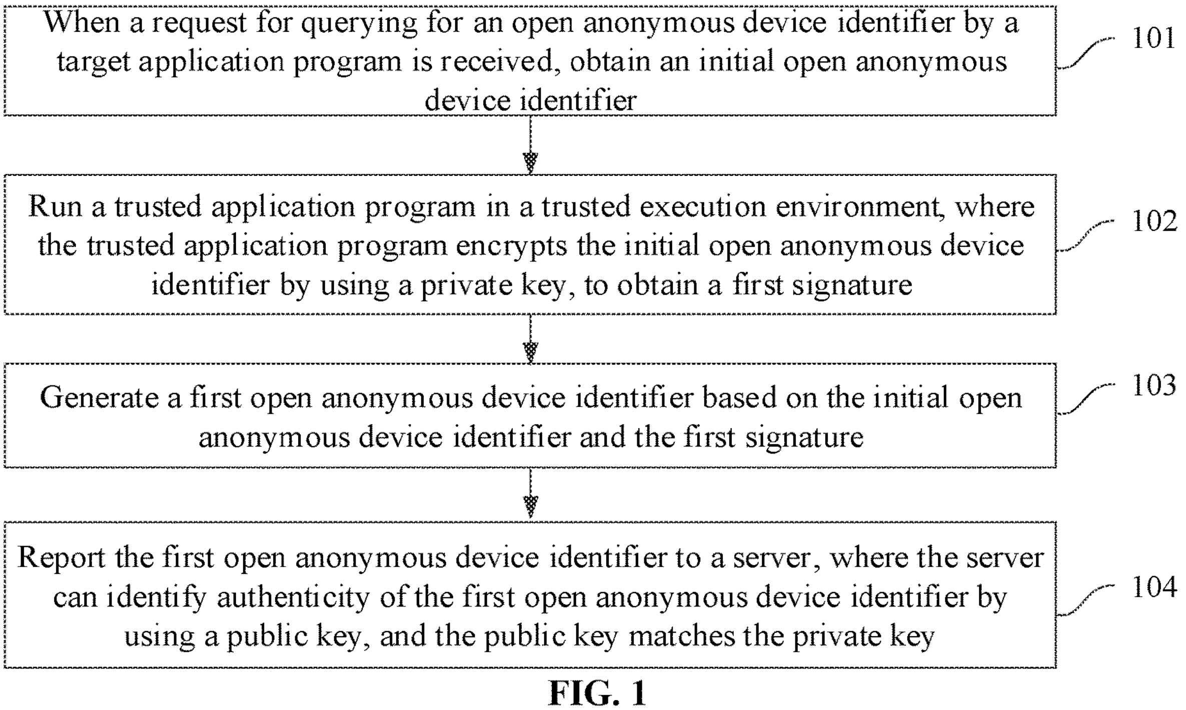
FIG. 1 is a schematic flowchart of a device identifier counterfeiting prevention method according to an embodiment of this application.

FIG. 1 is a schematic flowchart of a device identifier counterfeiting prevention method according to an embodiment of this application. As shown in FIG. 1, an embodiment according to a first aspect of this application provides a device identifier counterfeiting prevention method, performed by an electronic device. The method includes the following steps.

Step 101: In a case that a request for querying for an open anonymous device identifier by a target application program is received, obtain an initial open anonymous device identifier.

In this embodiment of this application, to provide a personalized service on a premise that user privacy is protected, the target application program may invoke a get OAID interface to query for the open anonymous device identifier OAID, and then provide a corresponding service based on the open anonymous device identifier.

Optionally, the electronic device first generates the initial open anonymous device identifier according to a relevant rule. For example, when the initial open anonymous device identifier is generated, the initial open anonymous device identifier may be generated by using an original rule, that is, the initial open anonymous device identifier is generally generated by using a reference value+a random value and then through hash processing. For example, OAID-SHA256 (hardware identification+random number).

Step 102: Run a trusted application program in a trusted execution environment, where the trusted application program encrypts the initial open anonymous device identifier by using a private key, to obtain a first signature.

The trusted execution environment (TEE) is a secure area within a central processing unit (CPU), runs in an independent environment, and runs in parallel with an operating system. The CPU ensures that confidentiality and integrity of code and data in the TEE are protected. The data and code are protected by using both hardware and software, and the TEE is more secure than the operating system. The trusted application program that is run in the TEE has access to all functions of a main processor and a memory of the device. However, hardware isolation is performed to protect the components from being affected by an application program that is installed by a user and that is run in a main operating system.

However, the trusted application program (Trusted APP, TA) can run in the TEE to process a sensitive service.

In this embodiment of this application, the trusted application program is run in the trusted execution environment and the generated initial open anonymous device identifier is encrypted by using the private key, so that security of the open anonymous device identifier can be greatly improved and a possibility of illegally stealing an encryption rule is reduced. In addition, even if a generation rule is illegally stolen, a probability of being cracked is greatly reduced because the generated initial open anonymous device identifier is encrypted by using the private key.

Step 103: Generate a first open anonymous device identifier based on the initial open anonymous device identifier and the first signature.

For example, the initial open anonymous device identifier and the first signature are spliced or combined, to obtain the first open anonymous device identifier.

Step 104: Report the first open anonymous device identifier to a server, where the server can identify authenticity of the first open anonymous device identifier by using a public key, and the public key matches the private key.

After the first open anonymous device identifier is generated, the first open anonymous device identifier may be reported to the server. The server may identify the authenticity of the first open anonymous device identifier reported by the electronic device. That is, the server may identify the authenticity of the first open anonymous device identifier by using the public key matching the private key, to obtain, from the server, an authenticity result of the reported first open anonymous device identifier, to perform a subsequent step, for example, whether to allow the target application program to invoke or generate relevant service data.

It should be noted that, in this embodiment of this application, the trusted application program encrypts the initial open anonymous device identifier by using an asymmetric encryption algorithm. The asymmetric encryption algorithm needs to use two keys, namely, the public key and the private key. The public key and the private key are a pair. If data is encrypted by using the public key, the data can be decrypted only by using the corresponding private key. Because encryption and decryption are performed by using two different keys, such an algorithm is referred to as an asymmetric encryption algorithm. A basic process of exchanging confidential information by using the asymmetric encryption algorithm is: Party A generates a pair of keys and makes a public key public, and another party (Party B) who needs to send information to Party A encrypts the confidential information by using the key (the public key of Party A) and then sends encrypted information to Party A. Party A decrypts the encrypted information by using a private key of Party A. In contrast, when Party A intends to reply to Party B, data is encrypted by using a public key of Party B. Similarly, Party B performs decryption by using a private key of Party B. In addition, Party A may sign the confidential information by using the private key of Party A before sending signed confidential information to Party B. Party B verifies, by using the public key of Party A, a signature of the data sent back by Party A.

Therefore, in this embodiment of this application, the initial open anonymous device identifier is encrypted on an electronic device side by using the private key, and the first open anonymous device identifier is decrypted on a server side by using the public key. If decryption meets an expectation, it is considered that the first open anonymous device identifier reported by the electronic device is genuine; or otherwise, the first open anonymous device identifier is counterfeit.

Therefore, in this embodiment of this application, in a process of generating the first open anonymous device identifier on the electronic device side, the trusted application program is run in the trusted execution environment for encryption by using the private key. Further, the first open anonymous device identifier is reported to the server after the first open anonymous device identifier is generated, to further check the authenticity of the first open anonymous device identifier, thereby greatly increasing difficulty of stealing and counterfeiting an anonymous identifier. In this case, relevant data of the target application program cannot be counterfeited. This is of great help in combating a hacker and purifying a network environment.

In some embodiments of this application, the reporting the first open anonymous device identifier to a server includes:

returning the first open anonymous device identifier to the target application program; and reporting, by the target application program, the first open anonymous device identifier to the server.

That is, in this embodiment of this application, after the first open anonymous device identifier is generated, the first open anonymous device identifier may be returned to the target application program, and the target application program reports the first open anonymous device identifier to the server, so that the server feeds back an authenticity identification result to the target application program. Then, the target application program performs a corresponding operation based on the authenticity identification result.

Optionally, after generating the first open anonymous device identifier, the electronic device may alternatively report the first open anonymous device identifier to the server while returning the first open anonymous device identifier to the target application program. That is, the target application program does not need to be used. Certainly, after generating the first open anonymous device identifier, the electronic device may further first report the first open anonymous device identifier to the server, and then return the first open anonymous device identifier to the target application program.

In some other embodiments of this application, after the reporting the first open anonymous device identifier to a server, the method further includes:

receiving an authenticity identification result returned by the server based on the first open anonymous device identifier; and in a case that the authenticity identification result is counterfeit, generating a log file and/or stopping providing an application program service, where the log file is used to record that the first open anonymous device identifier is counterfeit.

For example, after the authenticity identification result returned by the server is received based on the first open anonymous device identifier reported by the electronic device, corresponding processing may be performed based on the authenticity of the authenticity identification result and in combination with service logic of the target application program. For example, if the returned identification result is counterfeit, the target application program generates a corresponding log file to record that the currently queried first open anonymous device identifier is counterfeit, and/or the target application program stops providing an application program service. Specifically, that is, the target application program no longer generates or invokes relevant data. However, if the returned identification result is genuine, the target application program normally provides a corresponding application program service.

In this embodiment of this application, the generated initial open anonymous device identifier is encrypted in the trusted execution environment of the electronic device by using the private key, so that a risk of illegally stealing the generation rule related to the device identifier is effectively lowered. In addition, the server may identify the authenticity of the generated first open anonymous device identifier by using the public key matching the private key, thereby further enhancing management of the device identifier and ensuring data security.

Figure 2:
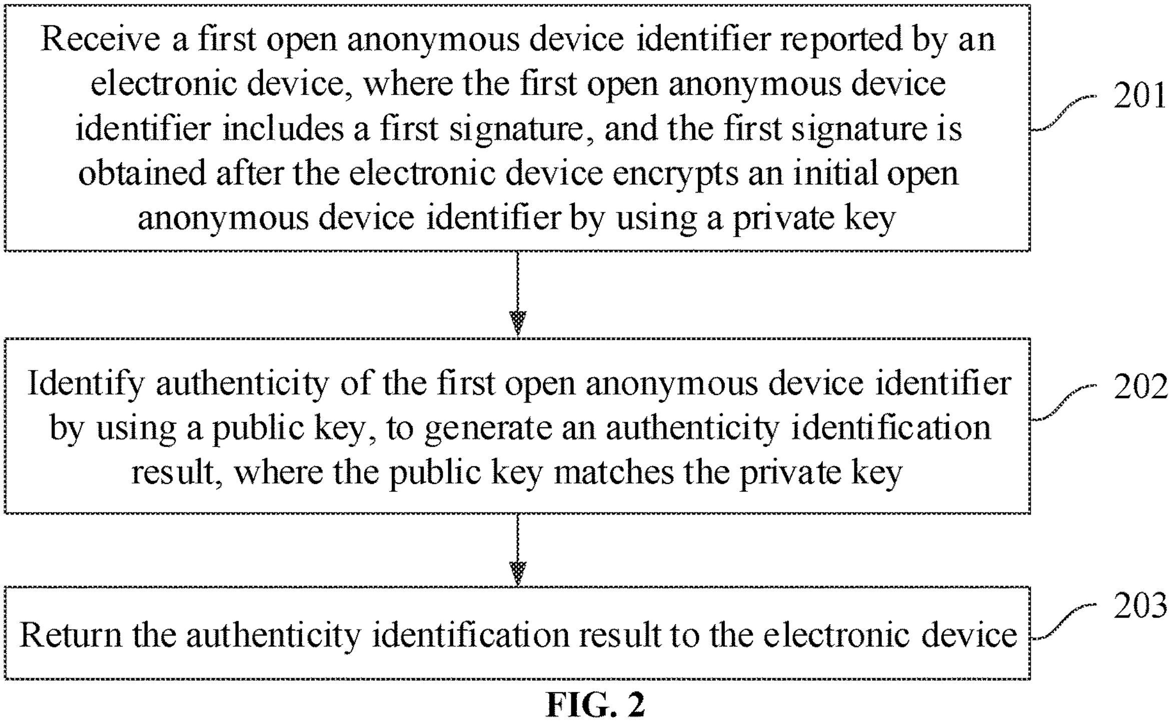
FIG. 2 is a schematic flowchart of a device identifier counterfeiting prevention method according to another embodiment of this application.

FIG. 2 is a schematic flowchart of a device identifier counterfeiting prevention method according to another embodiment of this application. As shown in FIG. 2, an embodiment according to a second aspect of this application further provides another device identifier counterfeiting prevention method, performed by a server. The method includes the following steps.

Step 201: Receive a first open anonymous device identifier reported by an electronic device, where the first open anonymous device identifier includes a first signature, and the first signature is obtained after the electronic device encrypts an initial open anonymous device identifier by using a private key.

The initial open anonymous device identifier may be generated by the electronic device according to a relevant rule. The first open anonymous device identifier is obtained based on the initial open anonymous device identifier and the first signature. A process of generating the first open anonymous device identifier by the electronic device is as described in the foregoing embodiment, and is not described herein again.

Step 202: Identify authenticity of the first open anonymous device identifier by using a public key, to generate an authenticity identification result, where the public key matches the private key.

In this embodiment of this application, the public key is stored in the server, and the public key matches the private key stored in the electronic device. Data encrypted by using the private key can be decrypted only by using the public key corresponding to the private key. Characteristics of the public key and the private key are as described in the foregoing embodiment and are not described herein again.

It can be known that when the server may successfully decrypt the first open anonymous device identifier by using the public key, it means that the first open anonymous device identifier is genuine; or otherwise, the first open anonymous device identifier is counterfeit, that is, the authenticity identification result includes both true and counterfeit situations.

Step 203: Return the authenticity identification result to the electronic device.

After generating the authenticity identification result, the server feeds back the authenticity identification result to the electronic device, so that a target application program on the electronic device performs corresponding processing based on the authenticity identification result and service logic of the target application program. For processing content herein, refer to the foregoing embodiment. Details are not described herein again.

In some embodiments of this application, after the generating an authenticity identification result, the method further includes:

in a case that the authenticity identification result of the first open anonymous device identifier is genuine, saving the first open anonymous device identifier into a device identifier database.

That is, if the authenticity identification result of the first open anonymous device identifier is genuine, the first open anonymous device identifier is reserved in the device identifier database for a subsequent query.

In short, in this embodiment of this application, the server provides an authenticity identification service of an open anonymous device identifier, so that the electronic device can report the first open anonymous device identifier to the server after generating the first open anonymous device identifier, to check the authenticity of the first open anonymous device identifier, thereby greatly increasing difficulty of stealing and counterfeiting the anonymous identifier. In this case, relevant data of the target application program cannot be counterfeited. This is of great help in combating a hacker and purifying a network environment.

Figure 3:
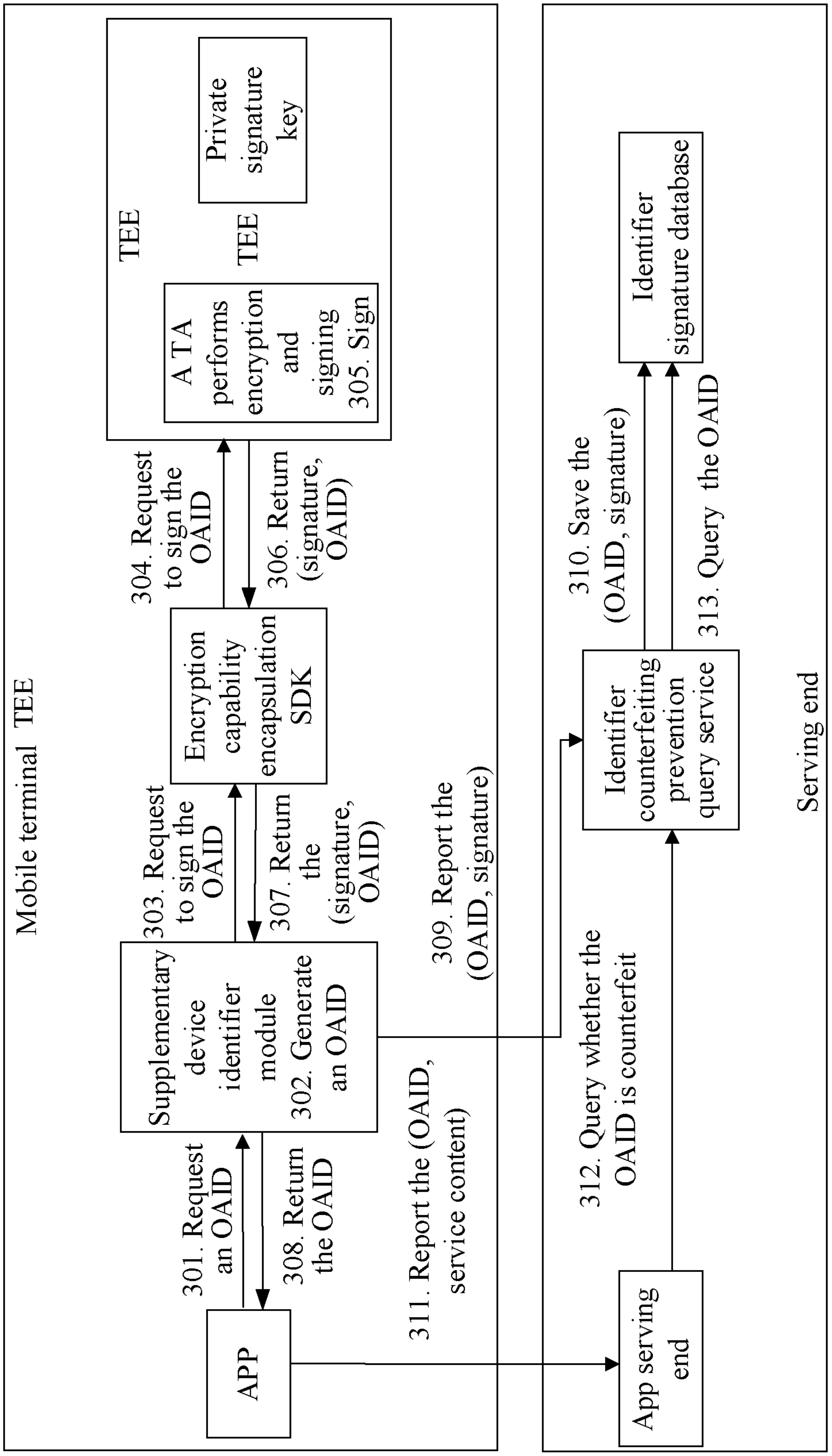
FIG. 3 is a schematic diagram of a structure of a device identifier counterfeiting prevention system according to an embodiment of this application.

FIG. 3 is a schematic diagram of a structure of a device identifier counterfeiting prevention system according to an embodiment of this application. As shown in FIG. 3, in this embodiment of this application, a device identifier counterfeiting prevention method of this application is further described in combination with an electronic device (a mobile terminal) and a server (a serving end). In this embodiment of this application, a processing process of the electronic device and the server includes the following steps:

Step 301: An application (APP) invokes a get OAID interface of a supplementary device identifier module to query for an OAID.

The supplementary device identifier module is configured to generate an open anonymous device identifier.

Step 302: The supplementary device identifier module generates the OAID according to a relevant rule.

For example, OAID=SHA256 (hardware identification+random number).

Step 303: The supplementary device identifier module invokes a signature interface OAID of an encryption capability encapsulation software development kit (SDK).

The signature interface signature (OAID) may invoke a trusted application program in a trusted execution environment, and the encryption capability encapsulation SDK is a specific software package written to assist in encryption.

Step 304: The encryption capability encapsulation SDK sends the OAID to the TA in the TEE, and requests to sign the OAID.

Step 305: A TA module signs the input OAID by using an internally saved private signature key, to obtain an OAID signature (SIG).

Step 306: The TA module returns a result (an original OAID, the OAID signature SIG) to the encryption capability encapsulation SDK.

Step 307: The signature (OAID) interface returns the result (the original OAID, the OAID signature SIG) to the supplementary device identifier module.

Step 308: The supplementary device identifier module returns (the original OAID, the OAID signature SIG) as a new OAID to the APP, that is, the new OAID=the original OAID+the OAID signature SIG.

Step 309: The supplementary device identifier module reports <the original OAID, the OAID signature SIG> to an identifier counterfeiting prevention query service.

Step 310: The identifier counterfeiting prevention query service verifies the reported <the original OAID, the OAID signature SIG> based on a saved public key, that is, verifies whether the OAID signature SIG is correct; and if the verification is successful, saves the OAID signature SIG into a supplementary identifier signature database; or if the verification is unsuccessful, discards the OAID signature SIG.

Step 311: The APP reports information to an APP serving end, where the information includes the OAID (new) and service content.

Step 312: The APP serving end queries the identifier counterfeiting prevention query service to see whether the OAID is counterfeited, and performs corresponding processing based on a query result and in combination with service logic of the APP.

Step 313: The identifier counterfeiting prevention query service queries the supplementary identifier signature database based on the provided OAID; and if the query is successful, returns "genuine"; or if the query is unsuccessful, returns "counterfeit".

Among the foregoing steps, step 308 and step 309 may be performed synchronously or in turn. For example, step 308 is performed first and step 309 is performed later, or step 309 is performed first and step 308 is performed later.

In short, in this embodiment of this application, in a process of generating a first open anonymous device identifier on an electronic device side, the trusted application program is run in the trusted execution environment for encryption by using a private key. Further, the first open anonymous device identifier is reported to a server after the first open anonymous device identifier is generated, to further check authenticity of the first open anonymous device identifier, thereby greatly increasing difficulty of stealing and counterfeiting an anonymous identifier. Then, relevant data of a target application program cannot be counterfeited. This is of great help in combating a hacker and purifying a network environment.

It should be noted that the device identifier counterfeiting prevention method provided in this embodiment of this application may be performed by a device identifier counterfeiting prevention apparatus, or a control module that is in the device identifier counterfeiting prevention apparatus and that is configured to perform the device identifier counterfeiting prevention method. In the embodiments of this application, the device identifier counterfeiting prevention apparatus provided in the embodiments of this application is described by using an example in which the device identifier counterfeiting prevention apparatus performs the device identifier counterfeiting prevention method.

Figure 4:
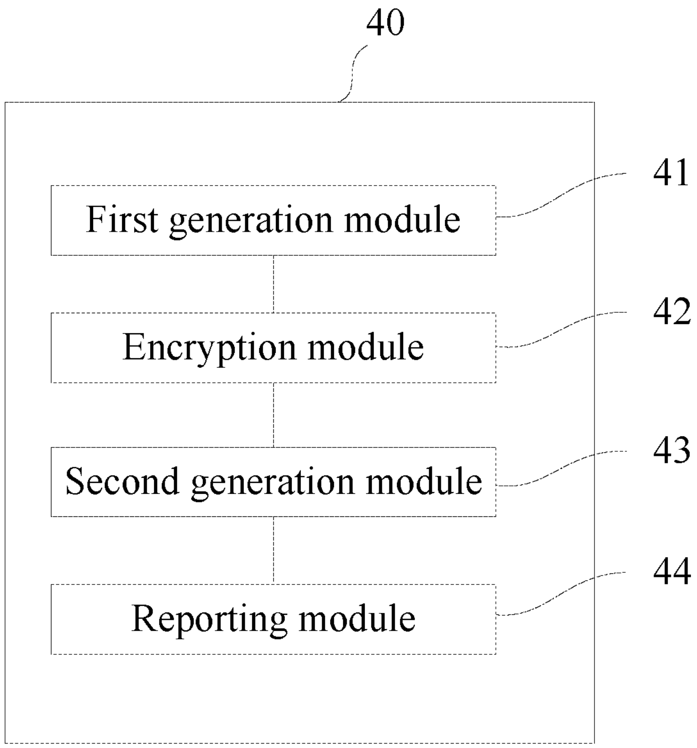
FIG. 4 is a schematic diagram of a structure of a device identifier counterfeiting prevention apparatus according to an embodiment of this application.

FIG. 4 is a schematic diagram of a structure of a device identifier counterfeiting prevention apparatus according to an embodiment of this application. As shown in FIG. 4, an embodiment of this application further provides a device identifier counterfeiting prevention apparatus, applied to an electronic device. The apparatus corresponds to the device identifier counterfeiting prevention method in the embodiment according to the first aspect. The apparatus 40 includes:

an obtaining module 41, configured to: in a case that a request for querying for an open anonymous device identifier by a target application program is received, obtain an initial open anonymous device identifier;

an encryption module 42, configured to run a trusted application program in a trusted execution environment, where the trusted application program encrypts the initial open anonymous device identifier by using a private key, to obtain a first signature;

a first generation module 43, configured to generate a first open anonymous device identifier based on the initial open anonymous device identifier and the first signature; and a reporting module 44, configured to report the first open anonymous device identifier to a server, where the server can identify authenticity of the first open anonymous device identifier by using a public key, and the public key matches the private key.

Optionally, the reporting module includes:

a returning unit, configured to return the first open anonymous device identifier to the target application program; and a reporting unit, configured to report, by the target application program, the first open anonymous device identifier to the server.

Optionally, the apparatus further includes:

a receiving module, configured to receive an authenticity identification result returned by the server based on the first open anonymous device identifier; and a second generation module, configured to: in a case that the authenticity identification result is counterfeit, generate a log file and/or stop providing an application program service, where the log file is used to record that the first open anonymous device identifier is counterfeit.

The device identifier counterfeiting prevention apparatus provided in this embodiment of this application can implement each process implemented in the method embodiment in FIG. 1. To avoid repetition, details are not described herein again.

In this embodiment of this application, the generated initial open anonymous device identifier is encrypted in the trusted execution environment of the electronic device by using the private key, so that a risk of illegally stealing a generation rule related to a device identifier is effectively lowered. In addition, the server may identify the authenticity of the generated first open anonymous device identifier by using the public key matching the private key, thereby further enhancing management of the device identifier and ensuring data security.

Figure 5:
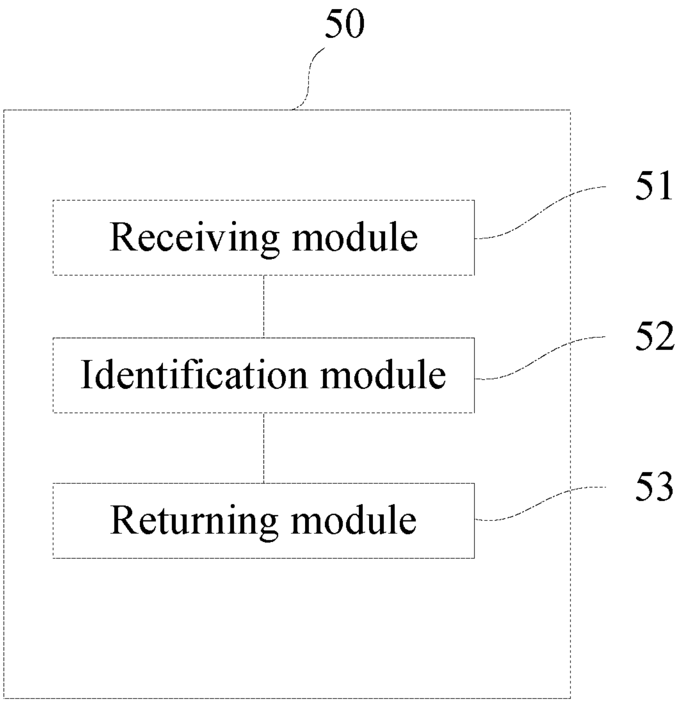
FIG. 5 is a schematic diagram of a structure of a device identifier counterfeiting prevention apparatus according to another embodiment of this application.

FIG. 5 is a schematic diagram of a structure of a device identifier counterfeiting prevention apparatus according to another embodiment of this application. As shown in FIG. 5, another embodiment of this application further provides a device identifier counterfeiting prevention apparatus, applied to a server. The apparatus corresponds to the device identifier counterfeiting prevention method in the embodiment according to the second aspect. The apparatus 50 includes:

a receiving module 51, configured to receive a first open anonymous device identifier reported by an electronic device, where the first open anonymous device identifier includes a first signature, and the first signature is obtained after the electronic device encrypts an initial open anonymous device identifier by using a private key;

an identification module 52, configured to identify authenticity of the first open anonymous device identifier by using a public key, to generate an authenticity identification result, where the public key matches the private key; and a returning module 53, configured to return the authenticity identification result to the electronic device.

Optionally, the apparatus further includes:

a saving module, configured to: in a case that the authenticity identification result of the first open anonymous device identifier is genuine, save the first open anonymous device identifier into a device identifier database.

The device identifier counterfeiting prevention apparatus provided in this embodiment of this application can implement each process implemented in the method embodiment in FIG. 2. To avoid repetition, details are not described herein again.

In this embodiment of this application, the server provides an authenticity identification service of an open anonymous device identifier, so that the electronic device can report the first open anonymous device identifier to the server after generating the first open anonymous device identifier, to check the authenticity of the first open anonymous device identifier, thereby greatly increasing difficulty of stealing and counterfeiting the anonymous identifier. In this case, relevant data of a target application program cannot be counterfeited. This is of great help in combating a hacker and purifying a network environment.

The device identifier counterfeiting prevention apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA), and the non-mobile electronic device may be a personal computer (PC), a television (TV), an automated teller machine, or a self-service machine. This is not specifically limited in this embodiment of this application.

The device identifier counterfeiting prevention apparatus in this embodiment of this application may be an apparatus with an operating system. The operating system may be an Android™ operating system, an iOS™ operating system, or another possible operating system. This is not specifically limited in this embodiment of this application.

Figure 6:
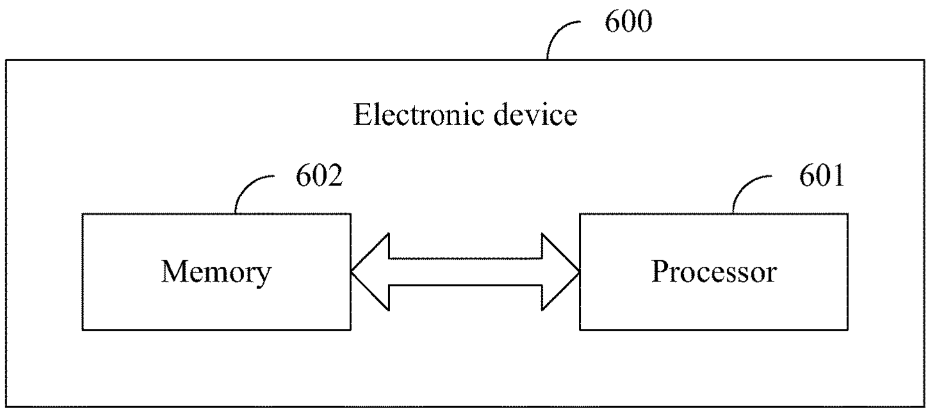
FIG. 6 is a schematic diagram of a structure of an electronic device according to an embodiment of this application.

Optionally, as shown in FIG. 6, an embodiment of this application further provides an electronic device 600, including a processor 601, a memory 602, and a program or instructions stored in the memory 602 and capable of running on the processor 601. When the program or the instructions are executed by the processor 601, the processes of the foregoing embodiment of the device identifier counterfeiting prevention method are implemented and a same technical effect can be achieved. To avoid repetition, details are not described herein again.

It should be noted that the electronic device in this embodiment of this application includes the foregoing mobile electronic device and the foregoing non-mobile electronic device.

Figure 7:
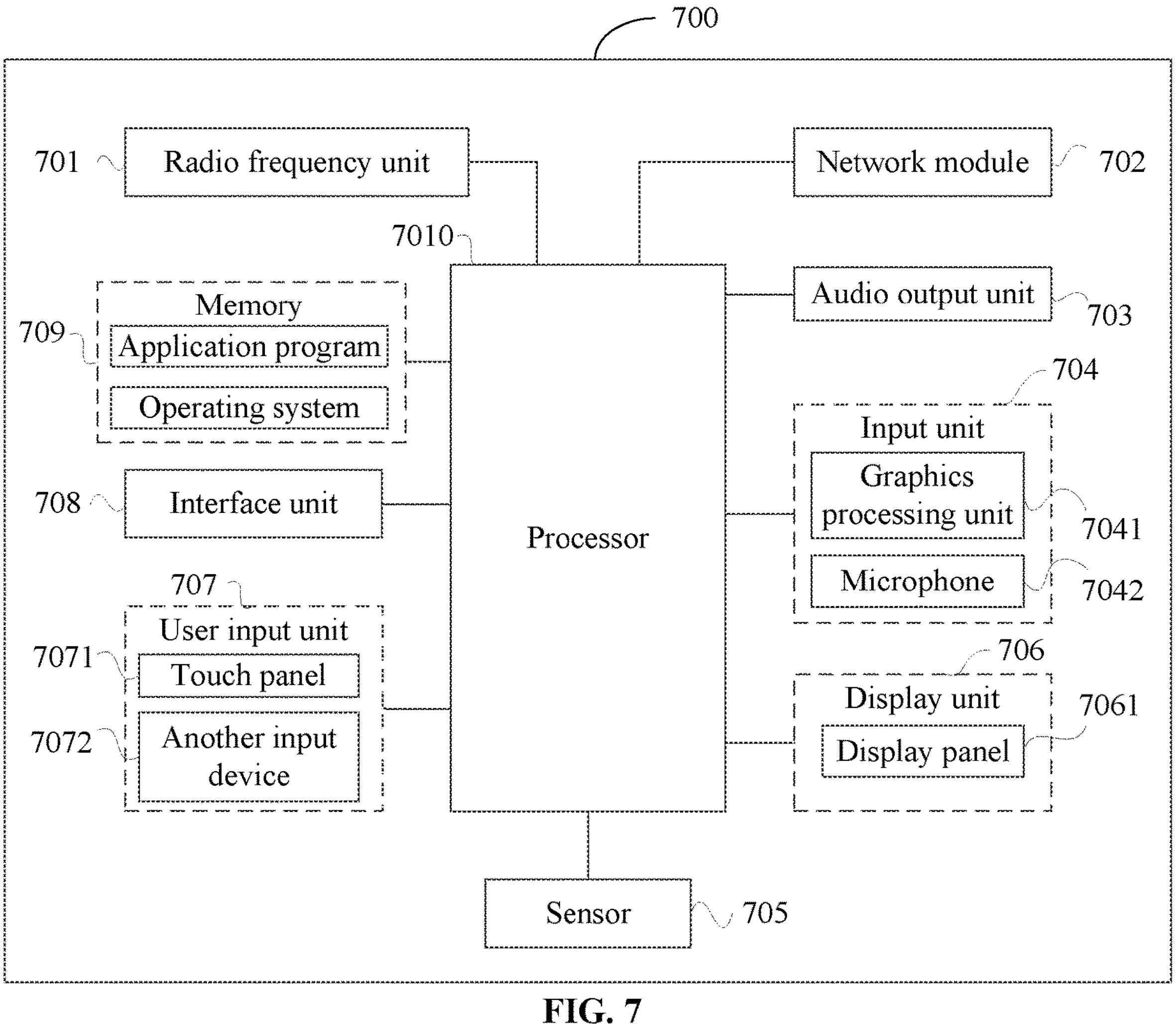
FIG. 7 is a schematic diagram of a hardware structure of an electronic device according to an embodiment of this application.

FIG. 7 is a schematic diagram of a hardware structure of an electronic device according to an embodiment of this application.

An electronic device 700 includes but is not limited to components such as a radio frequency unit 701, a network module 702, an audio output unit 703, an input unit 704, a sensor 705, a display unit 706, a user input unit 707, an interface unit 708, a memory 709, and a processor 7010.

A person skilled in the art can understand that the electronic device 700 may further include a power supply (such as a battery) that supplies power to each component. The power supply may be logically connected to the processor 7010 by using a power supply management system, to implement functions such as charging and discharging management, and power consumption management by using the power supply management system. The structure of the electronic device shown in FIG. 7 does not constitute a limitation on the electronic device. The electronic device may include components more or fewer than those shown in the diagram, a combination of some components, or different component arrangements. Details are not described herein.

The processor 7010 is configured to: in a case that a request for querying for an open anonymous device identifier by a target application program is received, obtain an initial open anonymous device identifier;

the processor 7010 is further configured to run a trusted application program in a trusted execution environment, where the trusted application program encrypts the initial open anonymous device identifier by using a private key, to obtain a first signature;

the processor 7010 is further configured to generate a first open anonymous device identifier based on the initial open anonymous device identifier and the first signature; and the radio frequency unit 701 is configured to report the first open anonymous device identifier to a server, where the server can identify authenticity of the first open anonymous device identifier by using a public key, and the public key matches the private key.

In this embodiment of this application, the generated initial open anonymous device identifier is encrypted in the trusted execution environment of the electronic device by using the private key, so that a risk of illegally stealing a generation rule related to a device identifier is effectively lowered. In addition, the server may identify the authenticity of the generated first open anonymous device identifier by using the public key matching the private key, thereby further enhancing management of the device identifier and ensuring data security.

Optionally, the reporting the first open anonymous device identifier to a server includes:

returning the first open anonymous device identifier to the target application program; and reporting, by the target application program, the first open anonymous device identifier to the server.

Optionally, the radio frequency unit 701 is further configured to receive an authenticity identification result returned by the server based on the first open anonymous device identifier; and the processor 7010 is further configured to: in a case that the authenticity identification result is counterfeit, generate a log file and/or stop providing an application program service, where the log file is used to record that the first open anonymous device identifier is counterfeit.

It should be understood that, in this embodiment of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. Optionally, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein. The memory 709 may be configured to store a software program and various data, including but not limited to an application program and an operating system. An application processor and a modem processor may be integrated into the processor 7010, the application processor mainly processes an operating system, a user interface, an application program, and the like, and the modem processor mainly processes wireless communication. It can be understood that, alternatively, the modem processor may not be integrated into the processor 7010.

An embodiment of this application further provides a readable storage medium. The storage medium may be volatile or non-volatile. The readable storage medium stores a program or instructions, and the program or the instructions are executed by a processor to implement each process of the foregoing embodiment of the device identifier counterfeiting prevention method, and a same technical effect can be achieved. To avoid repetition, details are not described herein again.

The processor is a processor in the electronic device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or instructions to implement each process of the foregoing embodiment of the device identifier counterfeiting prevention method, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such understanding, the technical solutions of this application essentially, or the part contributing to the related technology may be implemented in a form of a computer software product. The computer software product is stored in a storage medium (such as a ROM/RAM, a magnetic disk, or a compact disc), and includes a plurality of instructions for instructing a terminal (which may be a mobile phone, a computer, a server, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A device identifier counterfeiting prevention method, performed by an electronic device, wherein the method comprises:
- in a case that a request for an open anonymous device identifier from a target application program is received by a supplementary device identifier module of the electronic device, generating an initial open anonymous device identifier;
- running a trusted application program in a trusted execution environment; wherein the trusted execution environment is an independent secure area within a central processing unit (CPU), runs in parallel with an operating system, and only allows the trusted application program to run;
- sending the initial open anonymous device identifier by the supplementary device identifier module to the trusted application program to request to sign the initial open anonymous device identifier;
- encrypting the initial open anonymous device identifier by the trusted application program using a private key, to obtain a first signature;
- generating a first open anonymous device identifier by the trusted application program based on the initial open anonymous device identifier and the first signature, wherein the first open anonymous device identifier comprises the first signature;
- returning the first open anonymous device identifier to the supplementary device identifier module by the trusted application program; and
- transmitting the first open anonymous device identifier by the supplementary device identifier module to a server, such that the server identifies authenticity of the first open anonymous device identifier by using a public key that corresponds to the private key.

2. The method according to claim 1, wherein the transmitting the first open anonymous device identifier by the supplementary device identifier module to a server comprises:
- returning the first open anonymous device identifier to the target application program by the supplementary device identifier module; and
- transmitting, by the target application program, the first open anonymous device identifier and a service content to the server.

3. The method according to claim 1, after transmitting the first open anonymous device identifier by the supplementary device identifier module to a server, further comprising:
- receiving an authenticity identification result returned by the server based on the first open anonymous device identifier; and
- in a case that the authenticity identification result is that the first open anonymous device identifier is counterfeit, generating a log file or stopping providing an application program service, wherein the log file is used to record that the first open anonymous device identifier is counterfeit.

4. An electronic device, comprising a processor, a memory, and a program or instructions stored in the memory and capable of running on the processor, wherein the program or the instructions, when executed by the processor, cause the electronic device to perform:
- in a case that a request for an open anonymous device identifier from a target application program is received by a supplementary device identifier module of the electronic device, generating an initial open anonymous device identifier;

running a trusted application program in a trusted execution environment; wherein the trusted execution environment is an independent secure area within a central processing unit (CPU), runs in parallel with an operating system, and only allows the trusted application program to run;

sending the initial open anonymous device identifier by the supplementary device identifier module to the trusted application program to request to sign the initial open anonymous device identifier;

encrypting the initial open anonymous device identifier by the trusted application program using a private key, to obtain a first signature;

generating a first open anonymous device identifier by the trusted application program based on the initial open anonymous device identifier and the first signature, wherein the first open anonymous device identifier comprises the first signature;

returning the first open anonymous device identifier to the supplementary device identifier module by the trusted application program; and transmitting the first open anonymous device identifier by the supplementary device identifier module to a server, such that the server identifies authenticity of the first open anonymous device identifier by using a public key that corresponds to the private key.

5. The electronic device according to claim 4, wherein when transmitting the first open anonymous device identifier by the supplementary device identifier module to a server, the program or the instructions, when executed by the processor, cause the electronic device to perform:

returning the first open anonymous device identifier to the target application program by the supplementary device identifier module; and transmitting, by the target application program, the first open anonymous device identifier and a service content to the server.

6. The electronic device according to claim 4, wherein after transmitting the first open anonymous device identifier by the supplementary device identifier module to a server, the program or the instructions, when executed by the processor, cause the electronic device to further perform:

receiving an authenticity identification result returned by the server based on the first open anonymous device identifier; and in a case that the authenticity identification result is that the first open anonymous device identifier is counterfeit, generating a log file or stopping providing an application program service, wherein the log file is used to record that the first open anonymous device identifier is counterfeit.

7. A non-transitory readable storage medium, wherein the non-transitory readable storage medium stores a program or instructions, wherein the program or the instructions, when executed by a processor of an electronic device, cause the processor of the electronic device to perform:

in a case that a request for an open anonymous device identifier from a target application program is received by a supplementary device identifier module of the electronic device, generating an initial open anonymous device identifier;

running a trusted application program in a trusted execution environment; wherein the trusted execution environment is an independent secure area within a central processing unit (CPU), runs in parallel with an operating system, and only allows the trusted application program to run;

sending the initial open anonymous device identifier by the supplementary device identifier module to the trusted application program to request to sign the initial open anonymous device identifier;

encrypting the initial open anonymous device identifier by the trusted application program using a private key, to obtain a first signature;

generating a first open anonymous device identifier by the trusted application program based on the initial open anonymous device identifier and the first signature, wherein the first open anonymous device identifier comprises the first signature;

returning the first open anonymous device identifier to the supplementary device identifier module by the trusted application program; and transmitting the first open anonymous device identifier by the supplementary device identifier module to a server, such that the server identifies authenticity of the first open anonymous device identifier by using a public key that corresponds to the private key.

8. The non-transitory readable storage medium according to claim 7, wherein when transmitting the first open anonymous device identifier by the supplementary device identifier module to a server, the program or the instructions, when executed by the processor of the electronic device, cause the processor of the electronic device to perform:

returning the first open anonymous device identifier to the target application program by the supplementary device identifier module; and transmitting, by the target application program, the first open anonymous device identifier and a service content to the server.

9. The non-transitory readable storage medium according to claim 7, wherein after transmitting the first open anonymous device identifier by the supplementary device identifier module to a server, the program or the instructions, when executed by the processor of the electronic device, cause the processor of the electronic device to further perform:

receiving an authenticity identification result returned by the server based on the first open anonymous device identifier; and in a case that the authenticity identification result is that the first open anonymous device identifier is counterfeit, generating a log file or stopping providing an application program service, wherein the log file is used to record that the first open anonymous device identifier is counterfeit.

10. A chip, wherein the chip comprises a processor and a communication interface, the communication interface is coupled to the processor, and the processor is configured to run a program or instructions stored in a non-transitory readable storage medium of the chip, to implement the steps of the device identifier counterfeiting prevention method according to claim 1.

11. The chip according to claim 10, wherein when transmitting the first open anonymous device identifier by the supplementary device identifier module to a server, the processor is configured to run the program or instructions to perform:

returning the first open anonymous device identifier to the target application program by the supplementary device identifier module; and transmitting, by the target application program, the first open anonymous device identifier and a service content to the server.

12. The chip according to claim 10, wherein after transmitting the first open anonymous device identifier by the supplementary device identifier module to a server, the processor is configured to run the program or instructions to further perform:

receiving an authenticity identification result returned by the server based on the first open anonymous device identifier; and in a case that the authenticity identification result is that the first open anonymous device identifier is counterfeit, generating a log file or stopping providing an application program service, wherein the log file is used to record that the first open anonymous device identifier is counterfeit.

* * * * *